(12) United States Patent
Kostoff, II et al.

(10) Patent No.: US 7,120,847 B2
(45) Date of Patent: Oct. 10, 2006

(54) POWERLINE NETWORK FLOOD CONTROL RESTRICTION

(75) Inventors: Stanley J. Kostoff, II, Ocala, FL (US); William E. Earnshaw, Ocala, FL (US)

(73) Assignee: Intellon Corporation, Ocala, FL (US)

( * ) Notice: Subject to any disclaimer, the term of this patent is extended or adjusted under 35 U.S.C. 154(b) by 432 days.

(21) Appl. No.: 10/180,171

(22) Filed: Jun. 26, 2002

(65) Prior Publication Data

US 2004/0003338 A1  Jan. 1, 2004

(51) Int. Cl.
*G08C 25/02* (2006.01)
*H04L 1/08* (2006.01)

(52) U.S. Cl. .................. 714/748; 714/749; 714/776

(58) Field of Classification Search ........ 714/748–749, 714/776; G08C 25/02
See application file for complete search history.

(56) References Cited

U.S. PATENT DOCUMENTS

| | | | |
|---|---|---|---|
| 3,806,885 A | 4/1974 | Moore | |
| 4,569,044 A | 2/1986 | Tao et al. | |
| 4,581,734 A | 4/1986 | Olson et al. | |
| 4,630,261 A | 12/1986 | Irvin | |
| 4,677,612 A | 6/1987 | Olson et al. | |
| 4,720,850 A | 1/1988 | Oberlander et al. | |
| 4,726,018 A | 2/1988 | Bux et al. | |
| 4,792,947 A | 12/1988 | Takiyasu et al. | |
| 4,819,229 A | 4/1989 | Pritty et al. | |
| 4,881,241 A | 11/1989 | Pommier et al. | |
| 4,943,959 A | 7/1990 | Arnold | |
| 5,001,472 A | 3/1991 | Fischer et al. | |
| 5,003,539 A | 3/1991 | Takemoto et al. | |
| 5,046,069 A | 9/1991 | Calvignac et al. | |
| 5,081,678 A | 1/1992 | Kaufman et al. | |
| 5,105,423 A | 4/1992 | Tanaka et al. | |
| 5,121,396 A | 6/1992 | Irvin et al. | |
| 5,140,584 A | 8/1992 | Suzuki | |
| 5,157,659 A | 10/1992 | Schenkel | |
| 5,197,061 A | 3/1993 | Halbert-Lassalle et al. | |
| 5,214,646 A | 5/1993 | Yacoby | |
| 5,228,025 A | 7/1993 | Le Floch et al. | |
| 5,231,634 A | 7/1993 | Giles et al. | |
| 5,274,629 A | 12/1993 | Helard et al. | |
| 5,280,480 A | 1/1994 | Pitt et al. | |
| 5,307,376 A | 4/1994 | Castelain et al. | |
| 5,339,313 A | 8/1994 | Ben-Michael et al. | |
| 5,343,473 A | 8/1994 | Cidon et al. | |

(Continued)

FOREIGN PATENT DOCUMENTS

DE  6413144  10/1985

(Continued)

OTHER PUBLICATIONS

Kamerman, A.; Aben, G.; Net throughput with IEEE 802.11 wireless LANs; Wireless Communications and Networking Conference, 2000. WCNC. 2000 IEEE , vol.: 2 , Sep. 23-28, 2000; pp.: 747-752.*

(Continued)

*Primary Examiner*—R. Stephen Dildine
(74) *Attorney, Agent, or Firm*—Fish & Richardson P.C.

(57) ABSTRACT

A transmit process that limits the time during which a reduced network bandwidth exists between two powerline nodes because a receiving node fails to respond to frame transmission attempts by a transmitting node is described. The transmit process restricts the number of retries that occur in a lower date rate transmission mode and, for a predetermined time period to follow, drops all subsequent frames destined for the non-responding node.

14 Claims, 6 Drawing Sheets

U.S. PATENT DOCUMENTS

| | | |
|---|---|---|
| 5,384,777 A | 1/1995 | Ahmadi et al. |
| 5,416,801 A | 5/1995 | Chouly et al. |
| 5,426,646 A | 6/1995 | Slack |
| RE35,001 E | 7/1995 | Grow |
| 5,436,905 A | 7/1995 | Li et al. |
| 5,448,565 A | 9/1995 | Chang et al. |
| 5,452,288 A | 9/1995 | Rahuel et al. |
| 5,452,322 A | 9/1995 | Lauer |
| 5,473,602 A | 12/1995 | McKenna et al. |
| 5,481,535 A * | 1/1996 | Hershey ................... 714/749 |
| 5,483,529 A | 1/1996 | Baggen et al. |
| 5,488,632 A | 1/1996 | Mason et al. |
| 5,504,747 A | 4/1996 | Sweazey |
| 5,515,379 A | 5/1996 | Crisler et al. |
| 5,524,027 A | 6/1996 | Huisken |
| 5,537,414 A | 7/1996 | Takiyasu et al. |
| 5,541,922 A | 7/1996 | Pyhalammi |
| 5,548,649 A | 8/1996 | Jacobson |
| 5,555,268 A | 9/1996 | Fattouche et al. |
| 5,563,883 A | 10/1996 | Cheng |
| 5,563,897 A | 10/1996 | Pyndiah et al. |
| 5,568,476 A | 10/1996 | Sherer et al. |
| 5,610,908 A | 3/1997 | Shelswell et al. |
| 5,612,975 A | 3/1997 | Becker et al. |
| 5,615,212 A | 3/1997 | Ruszczyk et al. |
| 5,619,651 A | 4/1997 | Young |
| 5,623,512 A | 4/1997 | Sasaki |
| 5,627,829 A | 5/1997 | Gleeson et al. |
| 5,629,948 A | 5/1997 | Hagiwara et al. |
| 5,636,230 A | 6/1997 | Marturano et al. |
| 5,644,576 A | 7/1997 | Bauchot et al. |
| 5,651,009 A | 7/1997 | Perreault et al. |
| 5,694,389 A | 12/1997 | Seki et al. |
| 5,706,348 A | 1/1998 | Gray et al. |
| 5,717,689 A | 2/1998 | Ayanoglu |
| 5,732,113 A | 3/1998 | Schmidl et al. |
| 5,737,330 A | 4/1998 | Fulthorp et al. |
| 5,745,769 A | 4/1998 | Choi |
| 5,757,766 A | 5/1998 | Sugita |
| 5,757,770 A | 5/1998 | Lagoutte et al. |
| 5,764,931 A | 6/1998 | Schmahl et al. |
| 5,771,235 A | 6/1998 | Tang et al. |
| 5,787,071 A | 7/1998 | Basso et al. |
| 5,790,541 A | 8/1998 | Patrick et al. |
| 5,793,307 A | 8/1998 | Perreault et al. |
| 5,799,033 A | 8/1998 | Baggen |
| 5,812,599 A | 9/1998 | Van Kerckhove |
| 5,818,821 A | 10/1998 | Schurig |
| 5,818,826 A | 10/1998 | Gfeller et al. |
| 5,825,807 A | 10/1998 | Kumar |
| 5,828,677 A | 10/1998 | Sayeed et al. |
| 5,841,778 A | 11/1998 | Shaffer et al. |
| 5,841,873 A | 11/1998 | Lockhart et al. |
| 5,884,040 A | 3/1999 | Chung |
| 5,886,993 A | 3/1999 | Ruszczyk et al. |
| 5,892,769 A | 4/1999 | Lee |
| 5,896,561 A | 4/1999 | Schrader et al. |
| 5,903,614 A | 5/1999 | Suzuki et al. |
| 5,914,932 A | 6/1999 | Suzuki et al. |
| 5,914,959 A | 6/1999 | Marchetto et al. |
| 5,940,399 A | 8/1999 | Weizman |
| 5,940,438 A | 8/1999 | Poon et al. |
| 5,948,060 A | 9/1999 | Gregg et al. |
| 5,956,338 A | 9/1999 | Ghaibeh |
| 5,966,412 A | 10/1999 | Ramaswamy |
| 5,970,062 A | 10/1999 | Bauchot |
| 5,987,011 A | 11/1999 | Toh |
| 6,005,894 A | 12/1999 | Kumar |
| 6,006,017 A | 12/1999 | Joshi et al. |
| 6,041,063 A | 3/2000 | Povlsen et al. |
| 6,041,358 A | 3/2000 | Huang et al. |
| 6,044,154 A | 3/2000 | Kelly |
| 6,044,482 A | 3/2000 | Wong |
| 6,052,377 A | 4/2000 | Ohmi et al. |
| 6,076,115 A | 6/2000 | Sambamurthy et al. |
| 6,092,214 A | 7/2000 | Quoc et al. |
| 6,098,179 A * | 8/2000 | Harter, Jr. ................... 714/749 |
| 6,108,713 A | 8/2000 | Sambamurthy et al. |
| 6,125,150 A | 9/2000 | Wesel et al. |
| 6,130,887 A | 10/2000 | Dutta |
| 6,130,894 A | 10/2000 | Ojard et al. |
| 6,151,296 A | 11/2000 | Vijayan et al. |
| 6,169,744 B1 | 1/2001 | Grabelsky et al. |
| 6,182,147 B1 | 1/2001 | Farinacci |
| 6,188,717 B1 | 2/2001 | Kaiser et al. |
| 6,192,397 B1 | 2/2001 | Thompson |
| 6,202,082 B1 | 3/2001 | Tomizawa et al. |
| 6,215,792 B1 | 4/2001 | Abi-Nassif |
| 6,216,244 B1 | 4/2001 | Myers et al. |
| 6,222,851 B1 | 4/2001 | Petry |
| 6,243,386 B1 | 6/2001 | Chan et al. |
| 6,243,449 B1 | 6/2001 | Margulis et al. |
| 6,252,849 B1 | 6/2001 | Rom et al. |
| 6,259,696 B1 | 7/2001 | Yazaki et al. |
| 6,275,861 B1 | 8/2001 | Chaudri et al. |
| 6,278,685 B1 | 8/2001 | Yonge, III et al. |
| 6,278,716 B1 | 8/2001 | Rubenstein et al. |
| 6,289,000 B1 | 9/2001 | Yonge, III |
| 6,295,296 B1 | 9/2001 | Tappan |
| 6,334,185 B1 | 12/2001 | Hansson et al. |
| 6,343,083 B1 | 1/2002 | Mendelson et al. |
| 6,363,052 B1 | 3/2002 | Hosein |
| 6,370,156 B1 | 4/2002 | Spruyt et al. |
| 6,385,672 B1 | 5/2002 | Wang et al. |
| 6,397,368 B1 | 5/2002 | Yonge, III et al. |
| 6,421,725 B1 * | 7/2002 | Vermilyea et al. .......... 714/749 |
| 6,430,661 B1 | 8/2002 | Larson et al. |
| 6,434,153 B1 | 8/2002 | Yazaki et al. |
| 6,442,129 B1 | 8/2002 | Yonge, III et al. |
| 6,456,649 B1 | 9/2002 | Isaksson et al. |
| 6,466,580 B1 | 10/2002 | Leung |
| 6,469,992 B1 * | 10/2002 | Schieder .................... 714/749 |
| 6,473,435 B1 | 10/2002 | Zhou et al. |
| 6,480,489 B1 | 11/2002 | Muller et al. |
| 6,487,212 B1 | 11/2002 | Erimli et al. |
| 6,501,760 B1 | 12/2002 | Ohba et al. |
| 6,519,263 B1 | 2/2003 | Huth |
| 6,526,451 B1 | 2/2003 | Kasper |
| 6,538,985 B1 | 3/2003 | Petry et al. |
| 6,553,534 B1 | 4/2003 | Yonge, III et al. |
| 6,567,914 B1 | 5/2003 | Just et al. |
| 6,654,410 B1 | 11/2003 | Tzannes |
| 6,667,991 B1 | 12/2003 | Tzannes |
| 6,671,284 B1 | 12/2003 | Yonge, III et al. |
| 6,747,976 B1 | 6/2004 | Bensaou et al. |
| 6,765,885 B1 | 7/2004 | Jiang et al. |
| 6,778,507 B1 | 8/2004 | Jalali |
| 6,789,128 B1 | 9/2004 | Harrison et al. |
| 6,882,637 B1 | 4/2005 | Le et al. |
| 2001/0012319 A1 | 8/2001 | Foley |
| 2001/0043576 A1 | 11/2001 | Terry |
| 2001/0048692 A1 | 12/2001 | Karner |
| 2002/0001314 A1 | 1/2002 | Yi et al. |
| 2002/0012320 A1 * | 1/2002 | Ogier et al. ................. 714/749 |
| 2002/0042836 A1 | 4/2002 | Mallory |
| 2002/0048368 A1 | 4/2002 | Gardner |
| 2002/0065047 A1 | 5/2002 | Moose |
| 2002/0131591 A1 | 9/2002 | Henson et al. |
| 2002/0191533 A1 | 12/2002 | Chini et al. |
| 2003/0006883 A1 | 1/2003 | Kim et al. |

| | | |
|---|---|---|
| 2003/0217182 A1* | 11/2003 | Liu et al. .................... 709/249 |

FOREIGN PATENT DOCUMENTS

| WO | 98/57440 | 12/1998 |
|---|---|---|
| WO | WO 200072495 A2 * | 11/2000 |
| WO | 02/41598 | 5/2002 |

OTHER PUBLICATIONS

Dube, P.; Altman, E.; Queueing analysis of early message discard policy; Communications, 2002. ICC 2002. IEEE International Conference on, vol. 4, Iss., 2002; pp.: 2426-2430.*
U.S. Appl. No. 09/632,303, filed Aug. 4, 2000, Yonge, III.
U.S. Appl. No. 10/180,175, filed Jun. 26, 2002, Patella et al.
HomePlug Powerline Alliance, HomePlug 1.0.1 Specification, Dec. 1, 2001.
Sun et al., Public-key ID-based Cryptosystem, 1991, IEEE, pp. 142-144.
Bruschi, Danilo, Secure Multicast in Wireless Networks of Mobile Hosts: Protocols and Issues, 2002, Mobile Networks and Applications, pp. 503-511.
IBM, Combined use of collision resolution and collision avoidance MAC protocols, Oct. 1, 1994, IBM Technical Disclosure Bulletin, vol. 37, pp. 299-302 (NN9410299).
ISO/IEC 8802-3: 2002 International Standard (ANSI/IEEE Std 802.3) Carrier sense multiple access with collision detection (CSMA/CD) access method and physical layer specifications.
ISO/IEC 8802-11: 1999 International Standard (ANSI/IEEE Std 802.11) Wireless LAN Medium Access Control (CMAC) and Physical Layer (PHY) specifications.
Shared Wireless Access Protocol (Cordless Access) Specification, SWAP-CA Revision 1.21, Jan. 27, 1999, by the HomeRF™ Technical Committee.
Interface Specification for HomePNA™ 2.0—10M8 Technology, Dec. 1, 1999.
Interface Specification for HomePNA™ 2.0—10M8 Technology—Link Layer Protocols, Dec. 1, 1999.
Bux, "Token-Ring Local-Area Networks and Their Performance," Procs. Of the IEEE, vol. 77, No. 2, Feb. 1989.
Applied Cryptography, Second Edition: protocols, algorithms, and source code in C, Bruce Schneier, 1996.
PKCS #5 v. 20: Password-Based Cryptography Standard, RSA Laboratories, Mar. 25, 1999.
Lee et al., "HomePlug 1.0 powerline communications LANs—protocol description and performance results", Int. J. Commun. Syst., vol. 16 (2003).
Carrier sense multiple access with collision detection (CSMA/CD) access method and physical layer specifications, ISO/IEC 8802-3: 1996 International Standard (ANSI/IEEE Std 802.3).
Bertsekas et al., Data Networks, Prentice Hall, Englewood Cliffs, NJ, Section 2.4.3 Selective Repeat ARQ (1992).
HiPerformance Radio Local Area Network (HiperLAN) Type I: Functional Specification, European Standard (Telecommunication Series) No. 300652 V. 1.2.1 Jul. 1998.
An Architecture for Differentiated Services, IETF RFC 2475, Dec. 1998.
Goalic et al., "Real-Time Turbo-Decoding of Product Codes on a Digital Signal Processor," IEEE, pp. 624-628 (1997).
Benedetto et al., "A Soft-Input Soft-Output Maximum A Posteriori (MAP) Module to Decode Parallel and Serial Concatenated Codes," TDA Progress Report 42-127, pp. 1-20 (Nov. 1996).
Peterson et al., "Error-Correcting Codes," The MIT Press (1972).
Pyndiah, "Near-Optimum Decoding of Product Codes: Block Turbo Codes," IEEE Transactions on Communications, vol. 46, No. 8, pp. 1003-1010 (Aug. 1998).
Pyndiah, "Near Optimum Decoding of Product Codes," IEEE, pp. 339-343 (1994).
Pyndiah, "Performance of Block Turbo Coded 16-QAM and 64-QAM Modulations," IEEE, pp. 1039-1043 (1995).
Ehrsam et al., "A cryptopgraphic key management scheme for implementing the Data Encryption Standard," IBM Syst J, vol. 17, No. 2 (1978).

* cited by examiner

POWERLINE NETWORK FLOOD CONTROL RESTRICTION

BACKGROUND

The invention relates generally to network congestion control.

As broadband access expands and the number of Web-enabled devices used by consumers grows, emerging powerline networking technology allows consumers to plug those devices into ordinary house electrical outlets, thus turning existing residential wiring into a high speed data network. Unlike more conventional networks like Ethernet networks, however, powerline networks are susceptible to unpredictable noise and interference from numerous sources, e.g., halogen lights, home appliances such a vacuum cleaners, and the like. Numerous appliances and computer equipment can be plugged in at any time, and those units can be turned on or off at any time, or operated for any amount of time. These types of changes throughout the day cause the powerline network transfer function to change almost constantly. When two powerline network nodes are involved in a communication, for example, a transmitting node is sending a frame over the powerline medium to a receiving node, a significant change in the powerline network transfer function occurring between the two nodes (e.g., when the receiving node suffers a loss of power or is unplugged) may mean that no response will be received from the receiving node for a frame that the transmitting network node attempts to transmit to that node over the powerline network under such conditions. If the powerline nodes implement the media access control protocol specified by the HomePlug 1.0 Specification, the transmitting node attempts several transmission "retries" using a more robust, reduced data rate transmission mode. During a "retry" period, the powerline bandwidth is reduced because of the transmission of the robust retry frames on the powerline. The reduced bandwidth causes congestion to occur at the transmitting node. Consequently, buffers may not be available in the transmitting node to store frames waiting to be transmitted to the receiving node and other nodes. Under these conditions, transmissions destined for other nodes, including nodes that are able to receive and respond to transmissions, are effectively blocked as well. In addition, if the transmitting node is a bridge that is still receiving frames from another network, it cannot empty its buffers until frame transmissions to the powerline network are completed. As a result, bridge congestion may cause back pressure to be exerted on that other network.

SUMMARY

The invention features a mechanism that limits the time during which such a condition of reduced network bandwidth exists.

In one aspect, the invention provides methods and apparatus, including computer program products, for operating a transmitter in a node in a network of nodes each having a transmitter and a receiver. The methods include: (i) transmitting, in at least one transmission attempt, a frame over a shared channel to a receiver in another node, the frame being of the type for which a response is expected; (ii) determining if no response is received from the receiver; (iii) discarding the frame; and (iv) discarding any subsequent frames destined for the receiver without any transmission attempt for a predetermined time interval.

Embodiments of the invention can include one or more of the following features.

The methods can further include transmitting the frame to the receiver in reduced data rate transmission attempts until a threshold number of such reduced data rate transmission attempts have occurred without a response from the receiver.

The shared channel can be a powerline-based communications channel or, alternatively, an Ethernet-based communications channel.

The methods can further include setting a timer to run for the duration of the predetermined time interval when the frame is discarded and causing a flag associated with the address of the receiver to be set while the timer is running.

Discarding of any subsequent frames can include determining that each such subsequent frame is destined for the receiver, determining, for each such subsequent frame destined for the receiver, if the flag is set for the receiver, and discarding each such subsequent frame when it is determined that the flag is set for the receiver.

Particular implementations of the invention may provide one or more of the following advantages.

The technique of the present invention limits the time during which reduced network bandwidth exists by restricting the number of frame transmit attempts to a powerline node from which no responses are being received. After a threshold number of frame transmit attempts have occurred, and for a specific amount of time to follow, all subsequent frames destined for the non-responding node are dropped without attempting to transmit on the powerline medium, thus allowing the powerline medium bandwidth to return to a non-reduced network bandwidth state.

Other features and advantages of the invention will be apparent from the following detailed description and from the claims.

DETAILED DESCRIPTION

Figure 1:
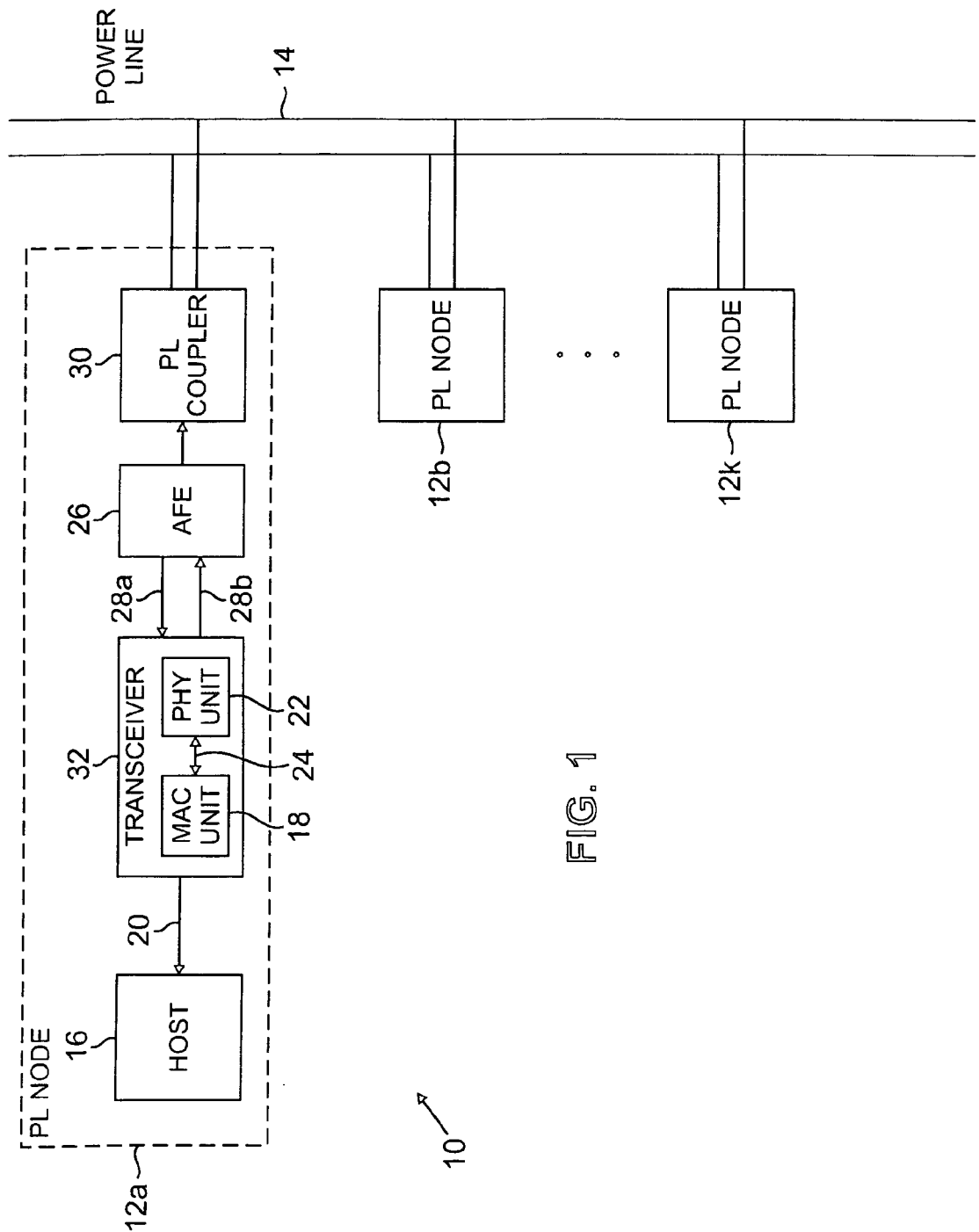
FIG. 1 is a block diagram of a powerline network.

Referring to FIG. 1, a network 10 includes network nodes 12a, 12b, . . . 12k coupled to a transmission medium or channel 14, e.g., a power line (PL), as shown. During a communication between at least two of the network nodes 12 over the transmission medium 14, a first network node, for example, 12a, serves as a transmitting network node (or transmitter) and at least one second network node, for example, 12b, serves as a receiving network node (or receiver). Each network node 12 includes a host unit (or host) 16. The network node 12 further includes a media access control (MAC) unit 18 connected to the host 16 by a data interface 20, a physical layer (PHY) unit 22 connected to the MAC unit 18 by a MAC-to-PHY I/O bus 24 and an analog front-end (AFE) unit 26. The AFE unit 26 connects to the PHY unit 22 by separate AFE input lines 28a and output lines 28b, as well as connects to the transmission medium 14 by an AFE-to-PL interface or coupler 30. The host 16 is intended to represent any device that uses the units 18, 22, 26 and 30 to communicate with any other node on the PL network 10, or other network to which the PL network 10 may be connected. The units 16 18, 22, 26, 30 may reside in a single system "box", for example, a desktop computer with a built-in network interface, or may reside in separate boxes, e.g., units 18, 22, 26 30 could reside in a separate network adapter that connects to a host. The functionality of units 18 and 22 may be integrated in a single transceiver 32 (as shown). Thus, each node 12 represents any combination of hardware, software and firmware that appears to other nodes as a single functional and addressable node on the network.

Preferably, the MAC and PHY units conform to the Open System Interconnect (OSI) Model. More particularly, the MAC unit may conform to the OSI Model's data link MAC sublayer and the PHY layer unit to the OSI Model's physical layer. The MAC unit 18 performs data encapsulation/decapsulation, as well as media access management for transmit (TX) and receive (RX) functions. Preferably, the MAC unit 18 employs a collision avoidance medium access control scheme like carrier sense multiple access with collision avoidance (CSMA/CA) as described by the IEEE 802.11 standard, although other suitable MAC protocols of the collision avoidance type or other MAC protocol types may be used. The MAC unit 18 also provides Automatic Repeat request (ARQ) protocol support. The PHY unit 22 performs transmit encoding and receive decoding, modulation/demodulation, among other functions.

The unit of communication exchanged between nodes is in the form of a protocol data unit ("PDU"), also referred to as a packet or frame. The PDU may include data, i.e., payload (or MAC frame), in conjunction with a delimiter, or a delimiter by itself. The delimiter is a combination of preamble and frame control information. A MAC Service Data Unit (MSDU) refers to any information that the MAC unit 18 has been tasked to transport by upper protocol layers (e.g., OSI layers to which the OSI MAC layer provides services), along with any management information supplied by the MAC unit 18. The payload has a maximum length in time (for latency considerations) and a varying byte capacity determined by length and channel conditions. Therefore, the payload may have the capacity to contain an entire MSDU or only a segment of the MSDU.

Preferably, packets are transmitted and received by the PHY layer unit 22, as well as processed by the MAC unit 18, in accordance with techniques and formats described in U.S. Pat. No. 6,397,368, entitled "Forward Error Correction With Channel Estimation," in the name of Lawrence W. Yonge III et al., U.S. Pat. No. 6,442,129, entitled "Enhanced Channel Estimation," in the name of Lawrence W. Yonge III et al., U.S. Pat. No. 6,289,000, entitled "Frame Control Encoder/Decoder for Robust OFDM Frame Transmissions," in the name of Lawrence W. Yonge III, co-pending U.S. patent application Ser. No. 09/632,303, entitled "Media Access Control Protocol With Priority and Contention-Free Intervals," in the name of Lawrence W. Yonge III, co-pending U.S. patent application Ser. No. 10/180,175, entitled "A Communication Buffer Scheme Optimized for VOIP, QOS and Data Networking Over a Power Line", in the name of James Philip Patella, U.S. Pat. No. 6,278,685, entitled "Robust Transmission Mode", in the name of Lawrence W. Yonge III et al., and the HomePlug 1.0 Specification, all of which are incorporated herein by reference; however, other techniques may be used. The aforementioned U.S. Pat. No. 6,278,685 ("Robust Transmission Mode") describes a standard transmission mode and a reduced data rate, robust transmission mode (hereinafter, simply referred to as "ROBO mode"), implemented at the PHY layer. The ROBO mode provides for extensive diversity (in time and frequency) and data redundancy to improve the ability of the network nodes to operate under adverse conditions.

Preferably, the MAC unit 18 supports standard MAC functions, such as framing, as well as ensures Quality of Service and provides for reliable frame delivery through a number of different mechanisms such as those described in the above-referenced application Ser. No. 09/632,303. For example, it can support rate adaptive PHY characteristics and channel estimation control between each transmitter/receiver to establish PHY modulation parameters that are optimized for channel conditions in each direction. Also, ARQ is used to ensure delivery for unicast transmissions. The receipt of certain frame types requires acknowledgment by the receiver and ARQ uses different types of acknowledgments. The acknowledgment can be positive or negative depending on the status of the received frame. A correctly addressed frame with a valid PHY frame Check Sequence causes the receiver to transmit a positive acknowledgment (or "ACK") response to the originator. Transmitting nodes attempt error recovery by retransmitting frames that are known or are inferred to have failed. Failures occur due to collisions or bad channel conditions, or lack of sufficient resources at the receiver. Transmissions are known to have failed if a "NACK" (in the case of bad channel conditions) or "FAIL" (in the case of insufficient resources) response is received. Transmissions are inferred to have failed for some other reason (for example, due to collisions) if no response, that is, no ACK, NACK, FAIL or other defined response types not discussed herein, is received when one is expected.

As mentioned above, the MAC unit 18 supports segmentation/reassembly. The process of partitioning MSDUs from the host into smaller MAC frames or segments is referred to as segmentation. The reverse process is called reassembly. Segmentation improves chances of frame delivery over harsh channels and contributes to better latency characteristics for stations of higher priority. All forms of addressed delivery (unicast, multicast, broadcast) may be subject to segmentation. An MSDU arriving at the MAC unit 18 is placed in one or more segments depending on the size of the MSDU and the data rate the link will sustain. Every effort is made to transmit all of the segments of a single MSDU in a single, continuous burst of MAC frames. Acknowledgments and retransmissions occur independently for each segment.

Figure 2:
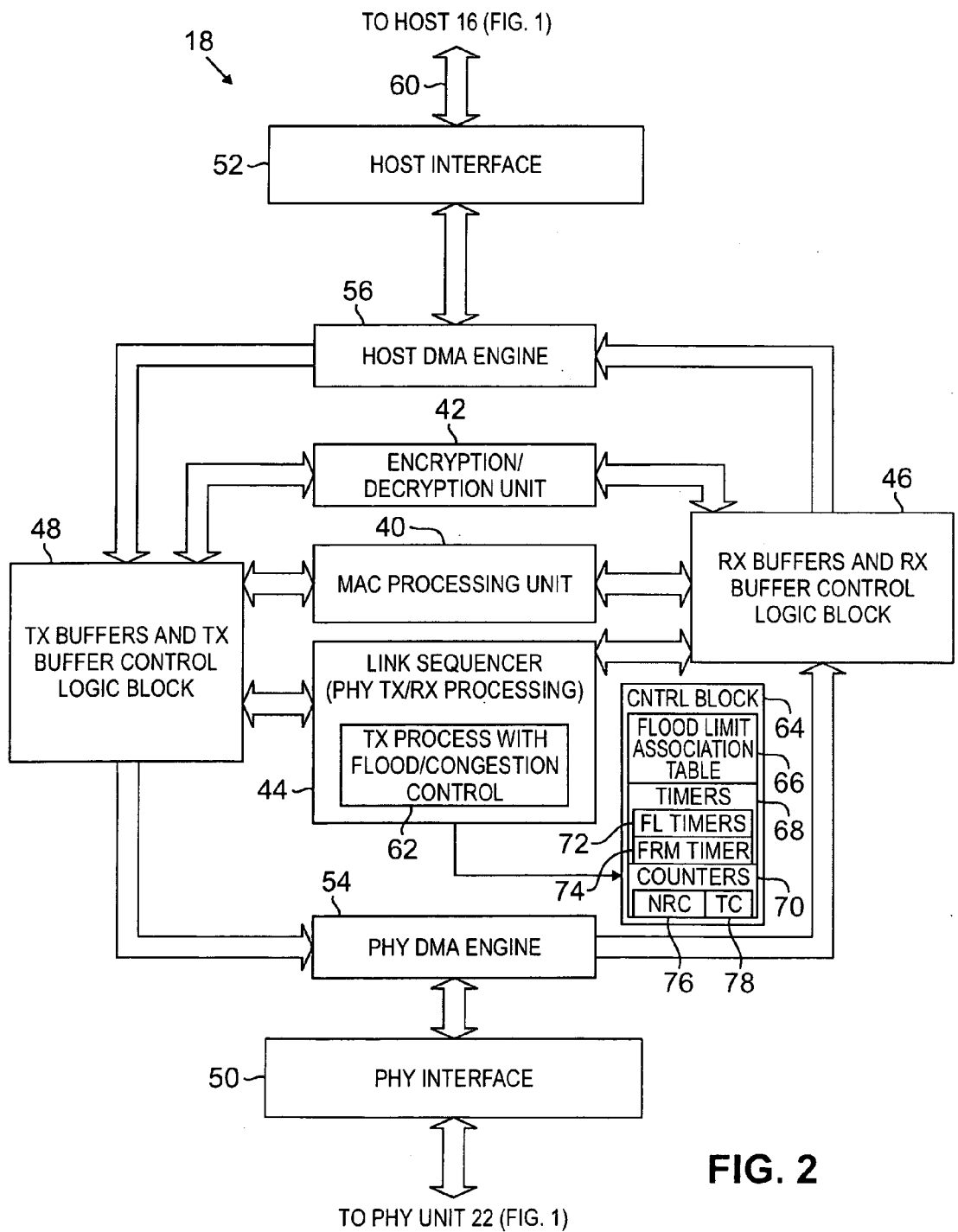
FIG. 2 is a block diagram of a media access control unit in each node in the powerline network of FIG. 1.

Referring to FIG. 2, an architectural representation of the MAC unit 18 is shown. The MAC unit 18 includes a MAC processing unit 40, an encryption/decryption unit 42 (hereinafter, simply unit 42) and a link sequencer 44. Coupled to these three functional blocks are buffer memory and control logic blocks 46 and 48. Block 46 includes RX buffers and control logic and the block 48 includes TX buffers and control logic. Preferably, these buffer memories are optimized for the multi-level channel access prioritization, as described in the above-referenced application entitled "A Communication Buffer Scheme Optimized for VOIP, QOS and Data Networking Over a Power Line."

The MAC unit 18 further includes a PHY interface 50 for coupling to the PHY unit 22 and a host interface 52 for coupling to the host 16. Although not shown, the host interface 52 includes separate host RX and TX interfaces. The MAC unit 18 includes two DMA engines, one for the PHY side, that is, a PHY DMA engine 54, and one for the host side, a host DMA engine 56. The PHY DMA engine 54 moves frame data from the PHY interface 50 to the RX buffer block 46. The host DMA engine 56 provides for the transfer of data from the RX buffer block 46 to the host interface 52. The host interface 52 provides the data as an output to the host 16 (FIG. 1) on a bus 60. The host interface receives TX data from the host 16 over the bus 60 and stores the TX data in a TX host interface buffer (not shown), coupled to the host interface 52 and the host DMA engine 56. The host DMA engine 56 transfers the TX frame data from the TX host interface buffer to the TX buffer block 48. Data is moved from the TX buffer memory 48 to the PHY interface 50 by the PHY DMA engine 54.

During receives, the link sequencer 44 receives RX segments which can be RX encrypted segments (RES) or cleartext. It parses frame control information of any incoming segments, as well as receives the body of any incoming segments, saves information about the channel characteristics and reassembles the segments. The link sequencer 44 accumulates segments until an entire frame is assembled. All segments are reassembled prior to any decryption to extract the MSDU. The MSDU or RX encrypted frame (REF) or RX cleartext frame (RCF) is then passed to the unit 42.

The unit 42 receives the reassembled frame from the link sequencer and, if the frame is encrypted, retrieves an appropriate network encryption key and decrypts the frame to generate the RCF. The unit 42 determines if there are any errors in the RCF. If there are no errors detected by the unit 42 for the RCF, the unit 42 provides the RCF to the MAC processing unit 40.

The MAC processing unit 40 parses and processes the cleartext frame body. It determines the type of frame body from the type value specified in the first occurring type field. If the frame data to follow is MSDU data, the type field and the frame data, along with the DA field and the SA field, are provided to the host 16 (FIG. 1) for further processing. Otherwise, the frame data comprises MAC management information, and the MAC processing unit 40 performs MAC management processing related tasks according to the MAC management information.

During transmits, the MAC processing unit 40 operates on requests made by the host 16. The unit 42 performs an encryption process on any MSDUs (processed by the MAC processing unit 40) that require encryption. Once encrypted, the link sequencer 44 segments MSDUs by partitioning the frame body into segments based on a maximum segment (or frame) size (or other parameters) until the last segment. The link sequencer 44 also initiates a transmission or transmission attempt, as well as subsequent transmission retries, as necessary.

Still referring to FIG. 2, and as indicated above, the link sequencer 44 includes a transmit process 62 (as well as a receive process, not shown). The transmit process 62 is optimized to perform flood limiting and congestion control, as will be described. To support this optimization, the unit 18 further includes a control block 64 in which the link sequencer 44 maintains a flood limiting association table 66, as well as various timers 68 and counters 70. More specifically, the timers include a Frame Delivery or Flood Limit (FL) timer 72 and a Frame Timer (FrmTimer) 74. A frame segment to be transmitted (or re-transmitted) is dropped when the FrmTimer expires (reaches zero) except while transmitting (including the response interval). The counters include a "No Response" Counter (NRC) 76 and a Transmit Counter (TC) 78. The TC 78 is incremented every time a frame is transmitted. It is reset to zero after any transmission for which an ACK is received when an ACK is expected, or transmission completes for unacknowledged service. The NRC 76 is incremented each time no response is received when a response is expected. The FrmTimer 74, as well as counters NRC 76 and TC 78, which are discussed in the above-referenced co-pending U.S. patent application Ser. No. 09/632,303, allow the transmit process 62 to limit the number of frame segment transmission retry attempts for a current segment of a frame, as well as discard the entire frame if the lifetime threshold has been exceeded.

Other control information that does not directly pertain to flood limiting and congestion control, for example, control information related to channel access contention, has been omitted herein. Preferably, channel access contention, and other aspects of operation not described herein, may be implemented according to techniques described in the above-referenced U.S. patent application Ser. No. 09/632,303 or HomePlug 1.0 Specification. Other techniques may be used as well.

Figure 3:
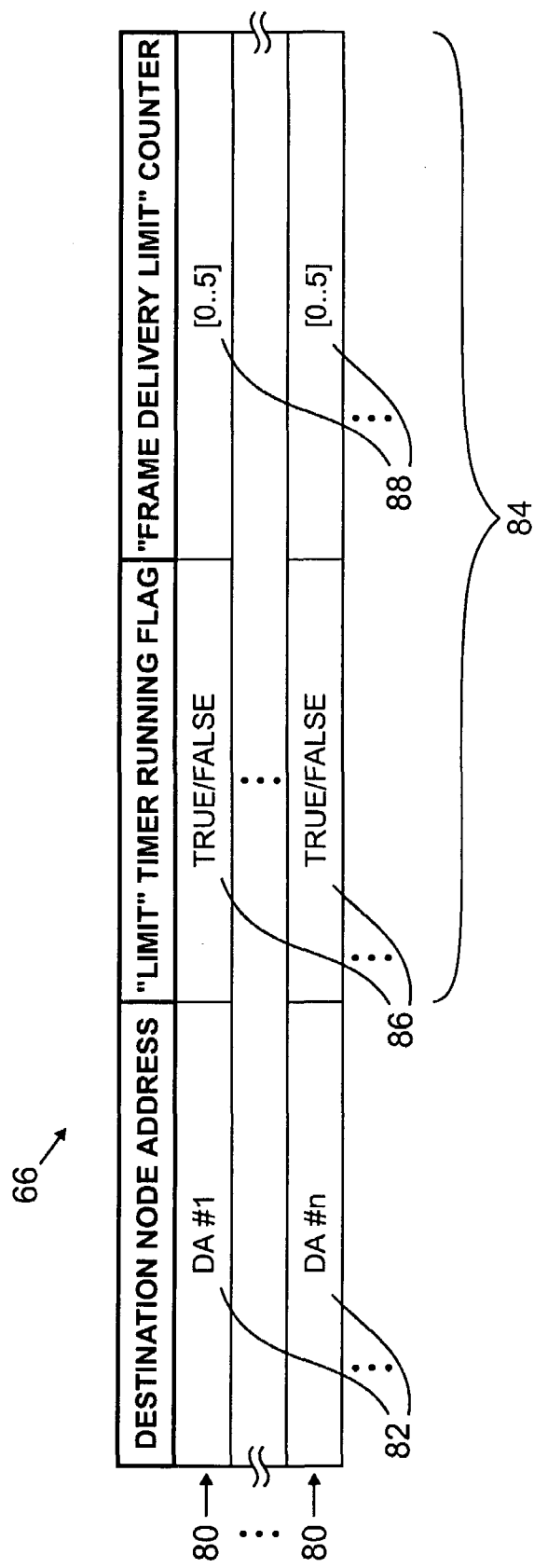
FIG. 3 is an illustration of a table that associates "flood limiting" control information with destination addresses and is maintained by the media access control unit of FIG. 2.

Referring to FIG. 3, the layout of the flood limiting association table 66 is shown. The table 66 includes a number of entries 80, one for each of the other nodes on the network, that is, one for each node or device whose address could appear as a destination address in transmissions by the node in which the table is maintained. Each entry 80 includes a destination node address 82 and frame delivery limit control information 84 associated with that destination node address 82. The frame delivery limit control information 84 includes a Frame Delivery Limit Timer Running flag ("DA_LTR flag") 86 and a Frame Delivery Limit Counter (FDLC) 88. Thus, the flag 86 and counter 88 are bound to the address specified in the destination node address 82 in the same entry 80. The FDLC 88 counts a restricted number of frame transmit attempts to a powerline node from which no responses are being received. The FDLC 88 is reset if a response is received before the FDLC 88 reaches a predetermined FDLC threshold count value N, e.g., N=5. When the FDLC 88 reaches the predetermined threshold count value, the FL timer 72 is set to measure a predetermined time period, e.g., an elapse of a specific number of seconds, during which all subsequent frames destined for the non-responding node are dropped without any attempt to transmit such frames on the medium. When the FL timer 72 is set, the flag 86 is set to a TRUE state and remains in that state until the FL timer 72 expires, at which time the flag 86 is set to a FALSE state. Thus, the flag 86 is indicative of whether or not the FL timer 72 is running and, therefore, whether or not frames destined for the node having the DA specified in the same entry as the flag 86 are to be discarded.

Thus, the process 62 uses the table 66 and the FL timer 72, in conjunction with the other timers and counters discussed above, not only to limit the amount of time a transmitting node spends attempting to transmit a frame segment or frame, but also to limit the time during which a reduced network bandwidth state exists by discarding subsequent frames addressed to the non-responding node for a period of time (marked by the FL timer). This action allows the effects of the congestion in the transmitting node (that is, the reduced network bandwidth) to be mitigated.

Figure 4A:
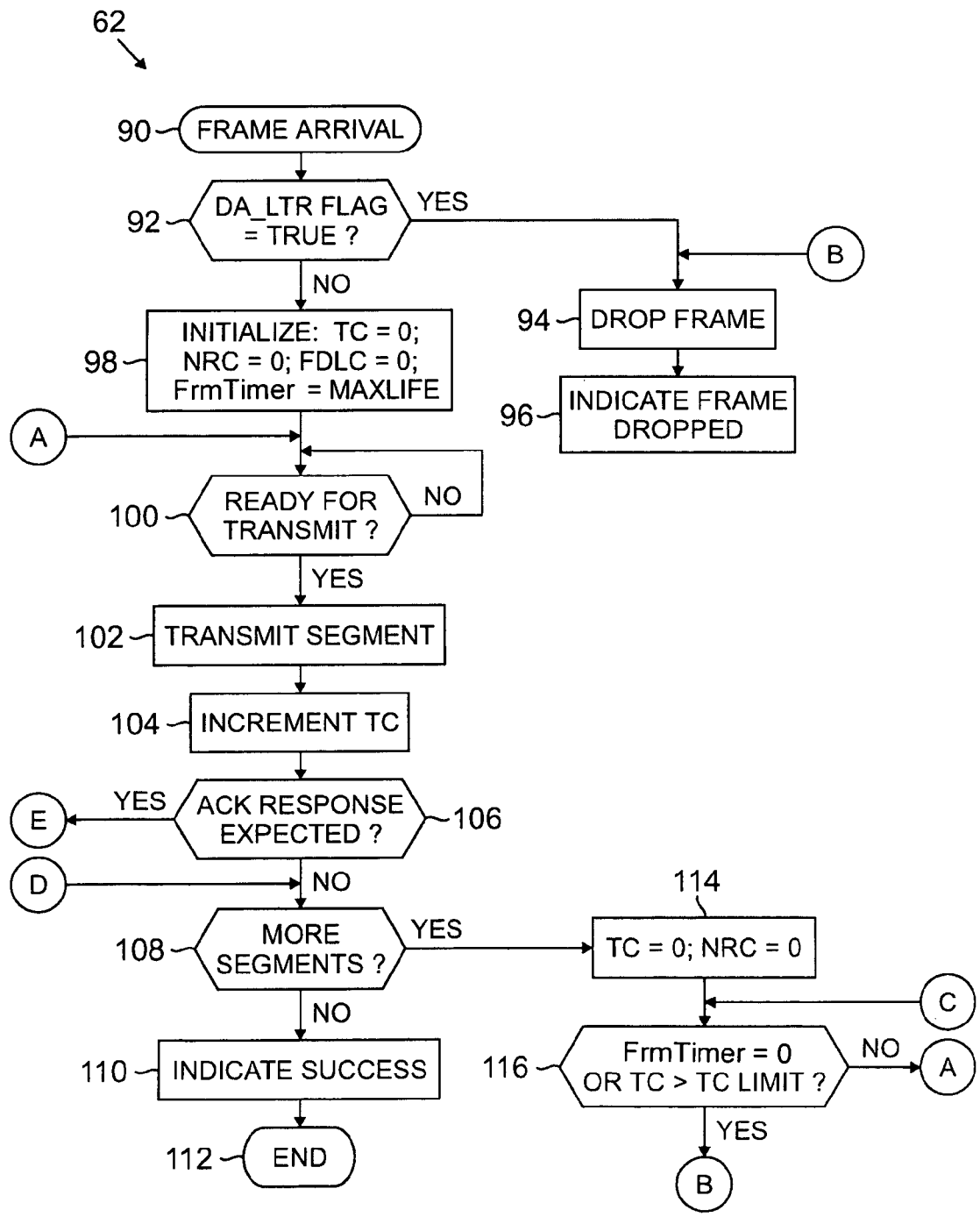
FIGS. 4A and 4B is a flow diagram of a flood limiting algorithm that is performed by the media access control unit of FIG. 2 during frame transmit processing.
Figure 4B:
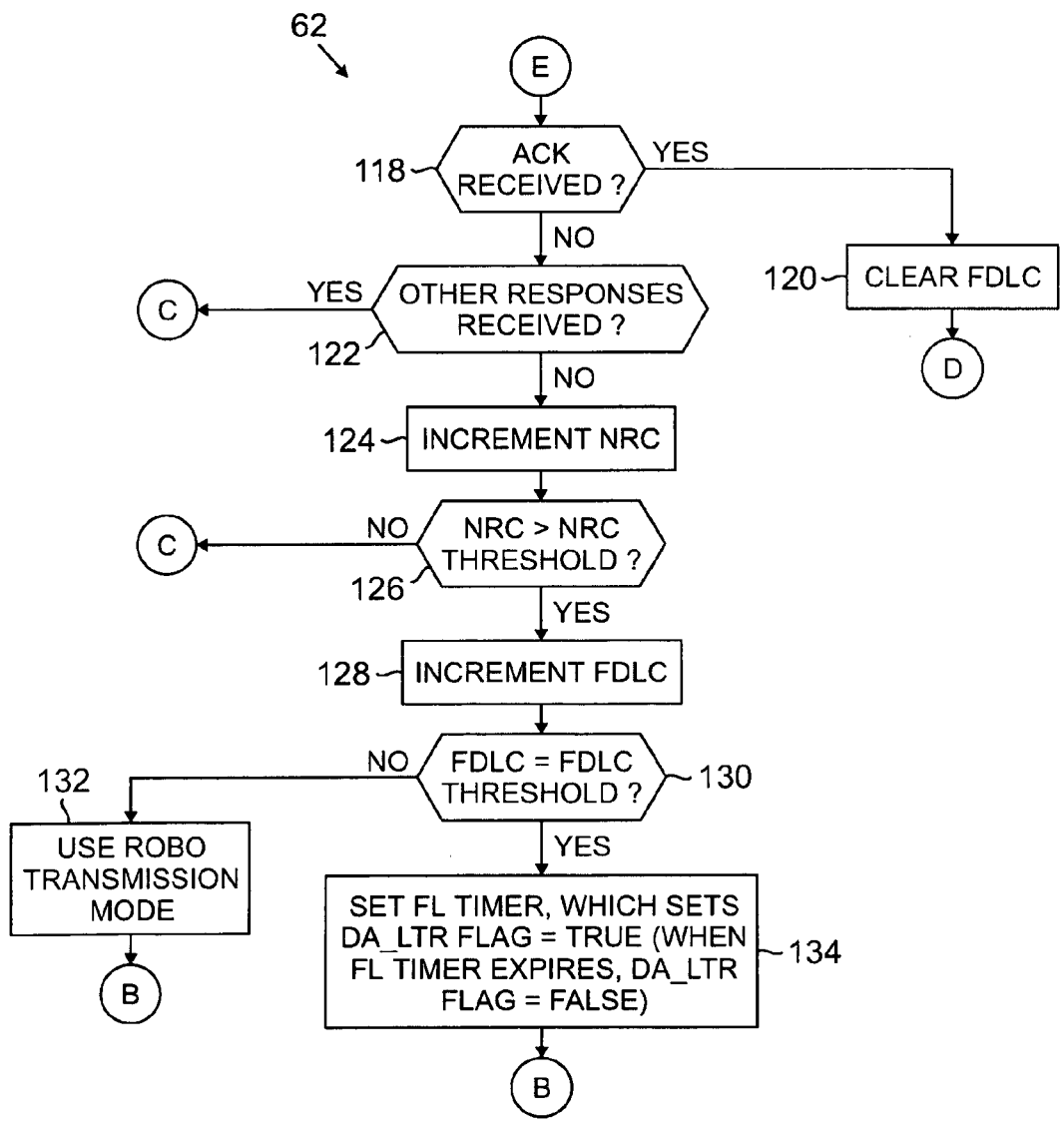

Referring to FIGS. 4A and 4B, the transmit process 62 for a given frame transmission begins with the arrival of a frame to be sent over the transmission medium (step 90). The process 62 determines if the DA_LTR flag 86 associated with the Destination Node Address (or simply Destination Address "DA") identified in the frame is set, that is, it finds the table entry 80 having the DA 82 that corresponds to the DA identified in the frame and, in that entry, determines if the DA_LTR flag 86 is equal to 'TRUE' (step 92). If the flag 86 is set, no attempt is made to transmit the frame to the DA. Thus, if DA_LTR flag is 'TRUE', the process 62 understands that the node to receive the frame has been so unresponsive to previous transmission attempts that the FL timer 72 for that node was set and has not yet expired. Consequently, the frame is dropped (step 94) and the process 62 provides an indication (to the requesting host) that the frame was dropped (step 96). If, at step 92, it is determined that the state of the DA_LTR flag is 'FALSE', the process 62 begins to prepare the frame for transmit. The process 62 initializes the counters TC 78, NRC 76 and FDLC 88 to zero, and FrmTimer 74 to a maximum frame lifetime default value "MAXLIFE" unless a lifetime value is passed down to the MAC unit by the host (step 98). The process 62 determines if the frame is ready for transmit (step 100). That is, the process 62 determines if it has access to the channel, e.g., using a channel access contention mechanism such as that described in the above-referenced application Ser. No. 09/632,303, or some other channel access determination mechanism. If the process 62 determines that it is ready for transmit, the process 62 transmits a first frame segment of the frame (step 102) and increments the TC 88 by one (step 104). The process 62 then determines if an ACK response is expected from the receiver corresponding to the specified DA (step 106). If no ACK response is expected, the process 62 determines if any additional segments are to be transmitted as part of the frame data transmission stream or burst (step 108). If the transmitted segment was the only segment, the process 62 indicates a successful frame transmission to the host (step 110) and terminates the frame transmit process for the current frame (step 112).

If the process 62 determines (at step 108) that more segments are to be transmitted, the process 62 resets TC 78 and NRC 76 to zero (step 114). The process 62 then determines if the frame should be dropped by determining if the FrmTimer 74 is equal to zero (that is, has expired) or TC 78 exceeds the transmit limit (step 116). If neither of the conditions is true, that is, the frame is not to be discarded, the process 62 returns to step 100. If either condition is true, the process 62 drops the frame (at step 94) and reports that the frame has been discarded (at step 96).

Referring again to step 106 and then step 118, if it is determined that an ACK response is expected and that the ACK has been received, the process 62 resets the FDLC 88 to its initial value (step 120) and returns to step 108 to determine if additional segments are to be transmitted as part of the frame transmission. If, at step 118, the process 62 determines that no ACK response has been received, it determines if any other responses (e.g., NACK, FAIL) have been received (step 122). If other responses have been received from the receiver node, the process 62 returns to step 116 to determine if the segment should be retransmitted or the frame is to be discarded. If no other responses are received, the process 62 increments the NRC 76 by one (step 124) and determines if the NRC 76 is greater than an NRC threshold (step 126). If the NRC 76 is determined to be less than the NRC threshold, the process 62 returns to step 116. If the NRC 76 is determined to be greater than the NRC threshold, the process 62 increments the FDLC 88 (step 128) and determines if the FDLC 88 is equal to the FDLC threshold value (step 130). If the FDLC 88 has not yet reached the FDLC threshold, the process 62 determines that the transmission mode is to be adjusted to ROBO Mode (if not already in ROBO mode) (step 132) and again returns to step 116. If it is determined that the FDLC 88 has reached the FDLC threshold value, the process 62 sets the FL timer 72, which, in turn, results in the DA_LTR flag 86 being adjusted to indicate a 'TRUE' state (step 134). Conversely, when the FL timer 72 expires, the DA_LTR flag 86 is adjusted to indicate a 'FALSE' state. Once the FL timer activity has commenced and associated flag adjustment has occurred, the process 62 returns to steps 94 and 96 to drop the current frame and report the "frame dropped" status to the host, respectively.

Thus, once a threshold number of retry attempts have been made in a standard data rate transmission mode, the data rate transmission mode is adjusted to the ROBO mode and the FDLC 88 begins to count the number of retries without response that are made in that mode. When an FDLC threshold number of retries have been attempted, the FL timer 72 begins to run and the current frame is dropped. For subsequent frame transmissions, that is, when the process 62 repeats for a next frame queued for transmission, the process 62 drops the frame to be transmitted if it determines from the state of the flag associated with the node to which the frame transmission is to be directed indicates that the FL timer 72 is running (as described at step 92 above) for that node.

Figure 5:
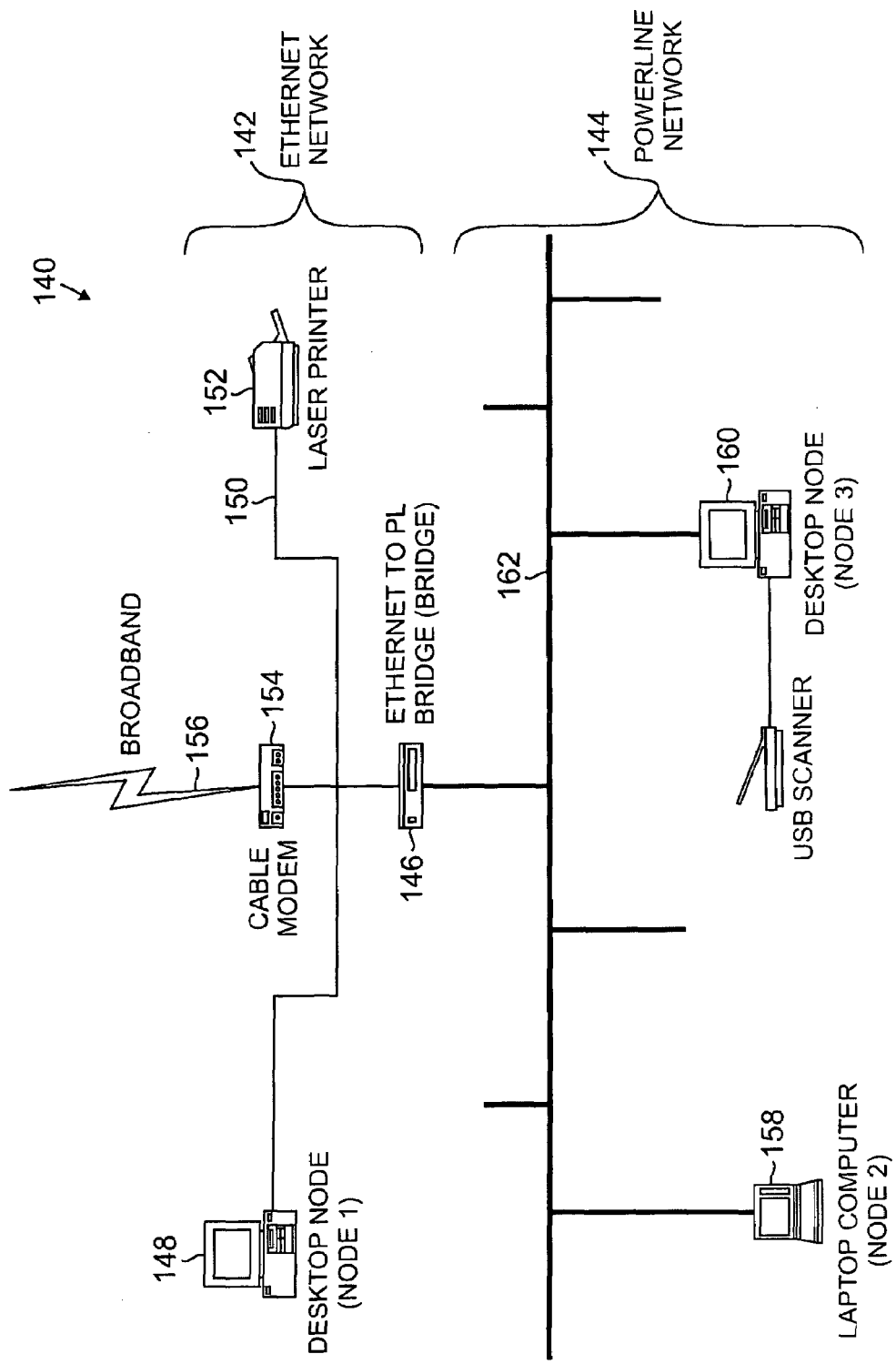
FIG. 5 is an exemplary topology in which an Ethernet network is coupled to a powerline network by an Ethernet-to-powerline bridge that includes a media access control unit such as that shown in FIGS. 2–3 and employs a flood limiting algorithm as illustrated in FIG. 4.

Referring now to FIG. 5, the operation of the transmit process 62 within the context of an exemplary bridged network environment 140 is shown. In the bridged network environment 140, a first network 142, shown as an Ethernet network, is coupled to a second network 144, shown as a powerline network, via a bridge device 146. In the example shown, the Ethernet network 142 includes a first node 148 ("node 1", shown as a desktop computer) connected to an Ethernet transmission medium 150. The network 142 can include other nodes as well. In addition, the network can include devices such as a laser printer 152 and a cable modem 154, usable to connect to other networks, e.g., over a Broadband connection 156, as shown. The powerline network 144 includes one or more powerline nodes, in this example, including a second node 158 ("node 2", shown as a laptop computer) and a third node 160 ("third node", which, like node 1, is depicted as a desktop node), connected to a powerline transmission medium 162. The bridge 146 includes a bridge application, as well as functional units 26, 30 and 32, shown in FIG. 1, to implement a bridge powerline network device that incorporates the transmit process 62 with flood limiting control, and supporting control logic 64, as was described above with reference to FIGS. 2–4A and 4B. In addition, the powerline network nodes 158 and 160 are implemented as described in FIGS. 1–4A and 4B.

In the environment 140, the first network 142 transmits traffic through the bridge 146 to the second network 144, that is, the powerline network 144. If a significant change in the powerline network transfer function occurs between the bridge 146 and the powerline network 144, or the powerline network 144 is powered down, the network 144 does not generate any responses to frames that the bridge 146 is attempting to transmit to the network 144. Under these conditions, and as is described in the HomePlug 1.0 Specification, as well as the process of FIG. 4, the bridge 146 drops to ROBO mode and makes several frame transmit retry attempts. During this time, the powerline bandwidth is reduced due to the ROBO retry frames on the medium 162 and the Ethernet bandwidth is reduced due to congestion in the bridge 146. The congestion occurs as a result of the bridge 146 not being able to empty any buffers.

In accordance with the process 62, the bridge 146 limits the time during which this reduced network bandwidth exists by restricting the number of frame transmit retry attempts to a node on the power line from which no responses are being received. After the restricted number of frame transmit attempts have occurred, and for a specific amount of time to follow, all subsequent frames destined for the non-responding node are dropped without attempting to transmit on the medium.

Still referring to FIG. 5, in one exemplary scenario, traffic is flowing from the first node 148 to the second node 158 through the Ethernet-to-Powerline bridge 146, and traffic is also flowing from the cable modem 154 to the third node 160 through the bridge 146. Under this same scenario, the second node 158 is unplugged, and the bridge 146 continues to transmit from the first node 148 to the second node 158, as well as from the cable modem 154 to the third node 160. Because the second node 158 is unplugged, it does not respond to transmissions directed to it by the first node 148. This lack of response causes the first node 148 to use the ROBO mode, which slows down transmissions from cable modem 154 to the third node 160. The transmit buffers fill up in the bridge 146, which causes the bridge 146 to exert back pressure on the first node 148 and the cable mode 154 through some type of flow control mechanism.

The ROBO mode re-transmit attempts continue until some number of unsuccessful re-transmit attempts have been made. That number of attempts corresponds to the FDLC threshold, and is specifically tracked in this instance for the FDLC 88 associated with the DA for the second node 158. When the FDLC threshold is reached, all traffic from the first node 148 to the second node 158 is dropped for a period of time measured by the FL timer 72 associated with the DA for the second node 158. These actions on the part of the bridge 146 enable normal transmission to resume between the cable modem 154 and the third node 160. That is, by eliminating transmission attempts to the non-responding node for a period of time in this manner, the bridge 146 allows transmission to other nodes (that would otherwise be blocked during those attempts) to occur.

It is to be understood that while the invention has been described in conjunction with the detailed description thereof, the foregoing description is intended to illustrate and not limit the scope of the invention, which is defined by the scope of the appended claims. For example, although the TX flood/congestion control mechanism 62 has been described within the context of a powerline network environment, the mechanism can be used to transmit on or into other types of networks, e.g., Ethernet. Other embodiments are within the scope of the following claims.

The invention claimed is:

1. In a network of nodes, each node having a transmitter and a receiver, a method of operating a transmitter in a node comprises:
   transmitting, in at least one transmission attempt, a frame over a shared channel to a receiver in another node, the frame being of the type for which a response is expected;
   determining if no response is received from the receiver;
   discarding the frame; and
   discarding any subsequent frames destined for the receiver without any transmission attempt for a predetermined time interval.

2. The method of claim 1, further comprising:
   transmitting the frame to the receiver in reduced data rate transmission attempts until a threshold number of such reduced data rate transmission attempts have occurred without a response from the receiver.

3. The method of claim 1, wherein the shared channel is a powerline-based communications channel.

4. The method of claim 1, wherein the shared channel is an Ethernet-based communications channel.

5. The method of claim 1, further comprising:
   setting a timer to run for the duration of the predetermined time interval when the frame is discarded; and
   causing a flag associated with the address of the receiver to be set while the timer is running.

6. The method of claim 5, wherein discarding any subsequent frames comprises:
   determining that each such subsequent frame is destined for the receiver;
   determining, for each such subsequent frame destined for the receiver, if the flag is set for the receiver; and
   discarding each such subsequent frame when it is determined that the flag is set for the receiver.

7. A computer program residing on a computer-readable medium for operating a transmitter in a node in a network of nodes each having a transmitter and a receiver, the computer program comprising instructions causing a computer to:
   transmit, in at least one transmission attempt, a frame over a shared channel to a receiver in another node, the frame being of the type for which a response is expected;
   determine if no response is received from the receiver;
   discard the frame; and
   discard any subsequent frames destined for the receiver without any transmission attempt for a predetermined time interval.

8. In a network of nodes, each node having a transmitter and a receiver, a transmitter in a node comprising:
   means for transmitting, in at least one transmission attempt, a frame over a shared channel to a receiver in another node, the frame being of the type for which a response is expected;
   means for determining if no response is received from the receiver;
   means for discarding the frame; and
   means for discarding any subsequent frames destined for the receiver without any transmission attempt for a predetermined time interval.

9. The transmitter of claim 8, further comprising:
   means for transmitting the frame to the receiver in reduced data rate transmission attempts until a threshold number of such reduced data rate transmission attempts have occurred without a response from the receiver.

10. The transmitter of claim 8, wherein the shared channel is a powerline-based communications channel.

11. The transmitter of claim 8, wherein the shared channel is an Ethernet-based communications channel.

12. The transmitter of claim 8, further comprising:
    means for setting a timer to run for the duration of the predetermined time interval when the frame is discarded; and
    means for causing a flag associated with the address of the receiver to be set while the timer is running.

13. The transmitter of claim 12, wherein means for discarding any subsequent frames comprises:
    means for determining that each such subsequent frame is destined for the receiver;
    means for determining, for each such subsequent frame destined for the receiver, if the flag is set for the receiver; and
    means for discarding each such subsequent frame when it is determined that the flag is set for the receiver.

14. A media access control device for use in nodes in a powerline network, comprising:
    a transmitter for transmitting frames onto the powerline network;

a control block coupled to the transmitter, the control block including a timer and a table for associating nodes on the powerline network with control information, the control information including a flag to indicate that the timer is running;

wherein the transmitter is operable to transmit, in at least one transmission attempt, a frame over a shared channel to a receiver in another node, the frame being of the type for which a response is expected;

wherein the transmitter is operable to set the timer and flag associated with the node in which the receiver resides if the frame is to be discarded for lack of a response from the receiver; and wherein the transmitter is operable to determine from the flag if a subsequent frame destined for the receiver is to be discarded without any transmission attempt.

* * * * *

UNITED STATES PATENT AND TRADEMARK OFFICE
CERTIFICATE OF CORRECTION

| | | |
|---|---|---|
| PATENT NO. | : 7,120,847 B2 | Page 1 of 1 |
| APPLICATION NO. | : 10/180171 | |
| DATED | : October 10, 2006 | |
| INVENTOR(S) | : Stanley J. Kostoff, II and William E. Earnshaw | |

It is certified that error appears in the above-identified patent and that said Letters Patent is hereby corrected as shown below:

On the title page item (56) References Cited, FOREIGN PATENT DOCUMENTS, "DE 6413144" should be -- DE 3413144 --.

On the title page item (56) References Cited, OTHER PUBLICATIONS, Page 3, first column, line 20, the "ISO/IEC 8802-11: 1999" reference, "(CMAC)" should be -- (MAC) --.

Column 1, line 16, "such a" should be -- such as --.

Column 3, line 8, after "16", insert a comma.

Signed and Sealed this

First Day of May, 2007

JON W. DUDAS
*Director of the United States Patent and Trademark Office*